(12) United States Patent
Chen

(10) Patent No.: US 9,552,083 B2
(45) Date of Patent: Jan. 24, 2017

(54) MULTI-FUNCTION TOUCH PEN AND ELECTRONIC DEVICE WITH MULTI-FUNCTION TOUCH PEN

(71) Applicant: HON HAI PRECISION INDUSTRY CO., LTD., New Taipei (TW)

(72) Inventor: Yi-Ru Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 178 days.

(21) Appl. No.: 14/461,572

(22) Filed: Aug. 18, 2014

(65) Prior Publication Data

US 2015/0049065 A1 Feb. 19, 2015

(30) Foreign Application Priority Data

Aug. 16, 2013 (CN) .......................... 2013 1 0358024

(51) Int. Cl.
*G06F 3/0354* (2013.01)
*G06F 1/16* (2006.01)

(52) U.S. Cl.
CPC ......... *G06F 3/03545* (2013.01); *G06F 1/1626* (2013.01); *G06F 1/1684* (2013.01); *G06F 2200/1632* (2013.01)

(58) Field of Classification Search
CPC .... G06F 3/03547; G06F 3/041; G06F 3/0412; G06F 3/0414; G06F 3/046; G06F 3/047; G06F 2203/041; G06F 3/033; G06F 3/03545; G06F 2203/04101; G06F 3/0317; G06F 3/03542; G06F 3/0386; G06F 1/1626; G06F 1/1684; G06F 2200/1632
See application file for complete search history.

(56) References Cited

U.S. PATENT DOCUMENTS

| | | | | |
|---|---|---|---|---|
| 2003/0069039 | A1* | 4/2003 | Lin | G06F 1/1626 455/556.1 |
| 2006/0290686 | A1* | 12/2006 | Shimizu | G06F 3/03545 345/179 |
| 2007/0205996 | A1* | 9/2007 | Huang | G06F 3/03545 345/179 |
| 2007/0263893 | A1* | 11/2007 | Kim | H04M 1/03 381/334 |
| 2013/0051576 | A1* | 2/2013 | Lu | H04M 1/6066 381/91 |
| 2014/0035887 | A1* | 2/2014 | Kim | B43K 23/008 345/179 |

* cited by examiner

*Primary Examiner* — Lun-Yi Lao
*Assistant Examiner* — Jarurat Suteerawongsa
(74) *Attorney, Agent, or Firm* — Zhigang Ma

(57) ABSTRACT

A multi-function touch pen for a portable electronic device includes a pen body and an audio output module. The pen body includes a touching input terminal, located at a first end of the pen body for inputting information to the portable electronic device, and an audio input unit located adjacent to the touch input terminal for inputting audio signals to the portable electronic device. The audio output module is located at a second end of the pen body for outputting audio signals generated from the portable electronic device.

18 Claims, 6 Drawing Sheets

MULTI-FUNCTION TOUCH PEN AND ELECTRONIC DEVICE WITH MULTI-FUNCTION TOUCH PEN

CROSS-REFERENCE TO RELATED APPLICATIONS

This application claims priority to China Patent Application No. 201310358024.X filed on Aug. 16, 2013 in the States Intellectual Property Office of China, the contents of which are incorporated by reference herein.

FIELD

The present disclosure relates to a multi-function touch pen and an electronic device with the multi-function touch pen.

BACKGROUND

A touch pen for use with a computerized apparatus having a touch control panel, such as a palm computer or a personal digital assistant, generally has only a single function. It is desirable to provide the touch pen with additional functions so as to enhance product competitiveness.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
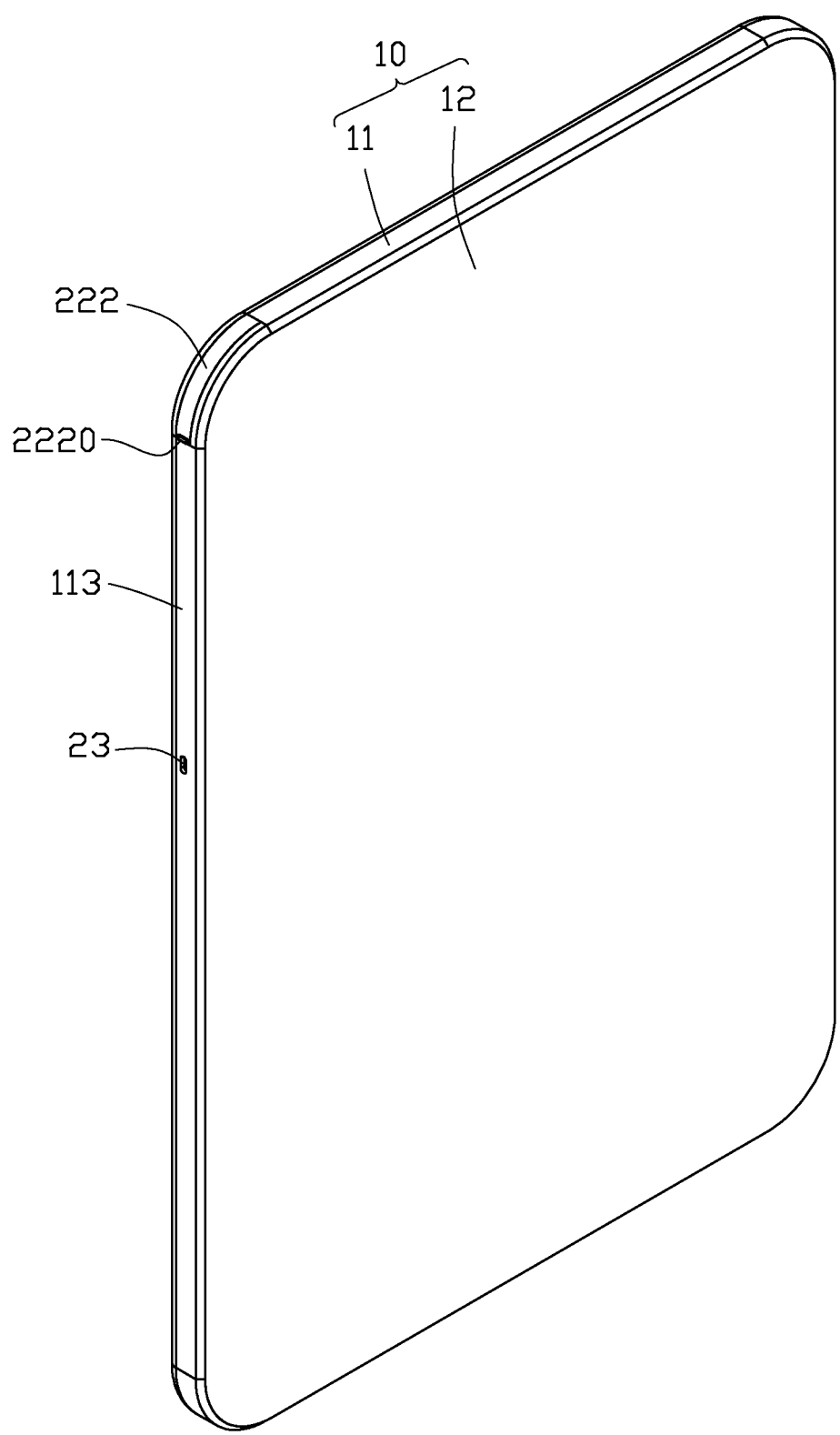
FIG. 1 is an assembled view of a portable electronic device with a multi-function touch pen.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
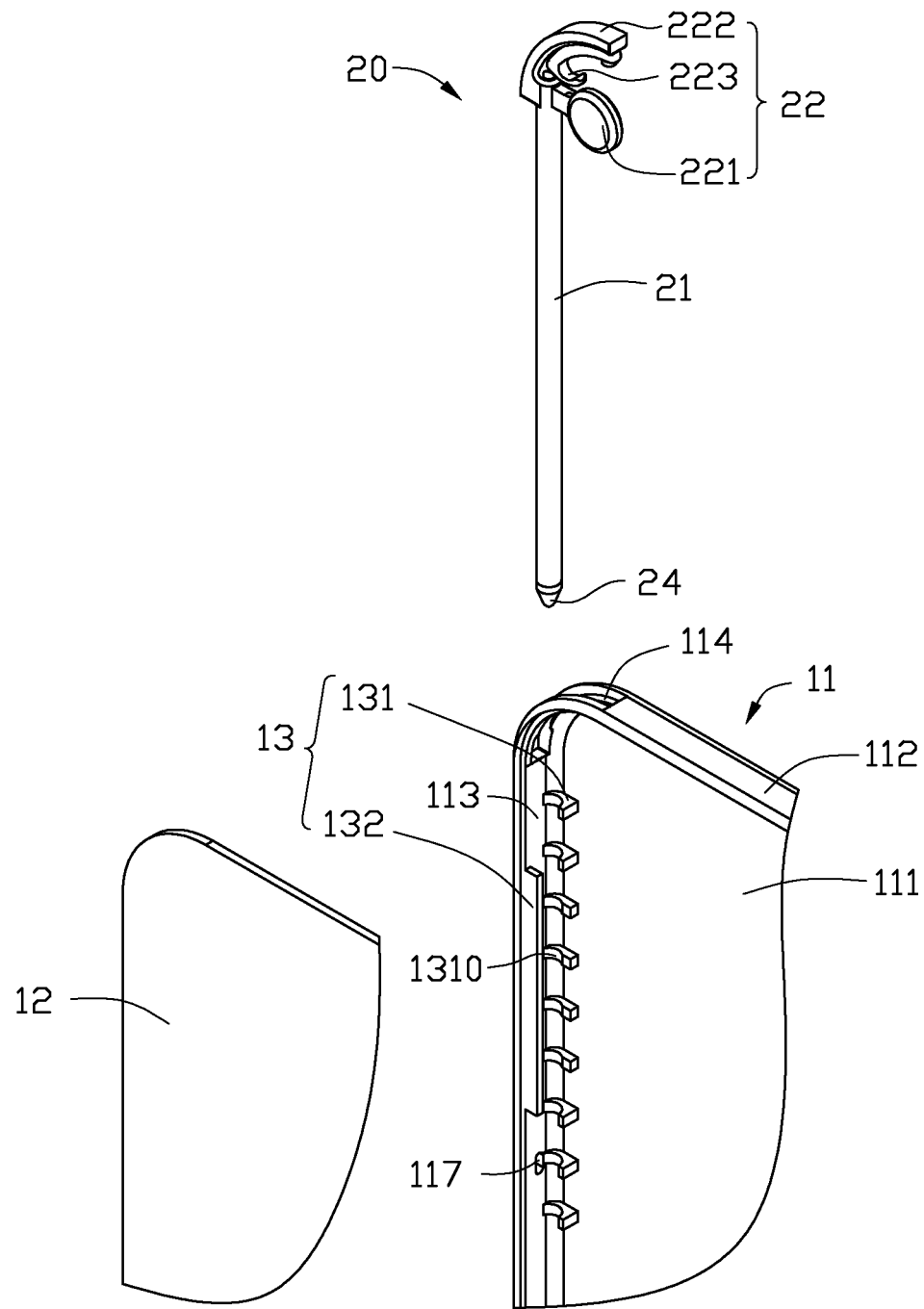
FIG. 2 is an exploded, partial view of the portable electronic device with the multi-function touch pen of FIG. 1.

FIGS. 1 and 2 illustrate an embodiment of a portable electronic device. The portable electronic device can be a tablet computer or a mobile phone. The portable electronic device includes a main body 10 and a multi-function touch pen 20 that can be received in the main body 10.

The main body 10 includes a frame 11 and a front panel 12 secured to the frame 11. The frame 11 includes a rear panel 111, a pair of first sidewalls 112 and a pair of second sidewalls 113. The pairs of first sidewalls 112 and pair of second sidewalls 113 are substantially perpendicular to the rear panel 111. The size and shape of the rear panel 111 is substantially the same as that of the front panel 12. The front panel 12 can be a touch sensitive display panel of the portable electronic device.

A mounting module 13 is located inside the frame 11 for mounting the multi-function touch pen 20. The mounting module 13 includes a plurality of supporting pieces 131 and a clamping piece 132. Each of the plurality of supporting pieces 131 is substantially perpendicular to the rear panel 111, and abuts one of the pair of second sidewalls 113 and the rear panel 111. The plurality of supporting pieces 131 are evenly spaced apart from each other. The clamping piece 132 is substantially parallel to the rear panel 111. A cutout 1310 is defined in each of the plurality of supporting pieces 131 and has a circular arc-shape. Centers of the plurality of cutouts 1310 are aligned with each other along a direction substantially parallel to the pair of second sidewalls 113. The clamping piece 132 substantially perpendicularly connects to an outer long edge of one of the pair of second sidewalls 113. The clamping piece 132 faces the plurality of supporting piece 131. A length of the clamping piece 132 can be less than a distance between top and bottom ones of the plurality of supporting pieces 131.

An accommodating opening 114 is defined in a joint portion of one of the first sidewalls 112 and one of the second sidewalls 113, and located above the mounting module 13. The multi-function touch pen 20 can be received in the main body 10 by passing through the accommodating opening 114, and secured in the mounting module 13.

Figure 3:
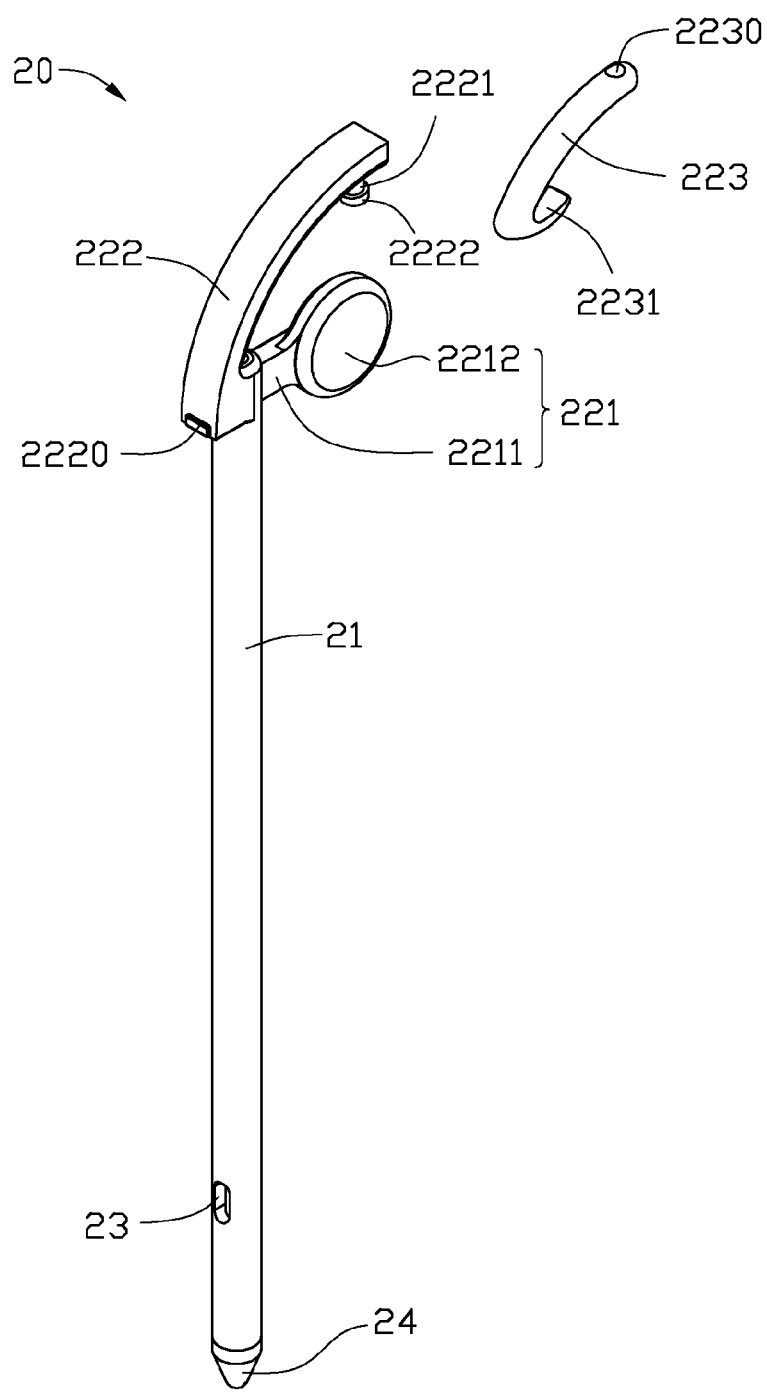
FIG. 3 is an exploded, isometric view of the multi-function touch pen of FIG. 2.

Referring to the FIGS. 2 and 3, the multi-function touch pen 20 includes a pen body 21, an audio output module 22, an audio input unit 23, and a touching input terminal 24. The audio output module 22 can be a bluetooth earphone. The audio output module 22 and the audio input unit 23 can be communicated with the portable electronic device by wireless communication technology such as Bluetooth or WI-FI (Wireless Fidelity).

The audio output module 22 is attached to a top end of the pen body 21. The touching input terminal 24 is located at a bottom end of the pen body 21. The audio input unit 23 is located adjacent to the bottom end of the pen body 21. A through hole 117 is defined in the frame 11 corresponding to the audio input unit 23.

Sound transmitting holes can be defined in the audio output module 22 and the audio input unit 23.

The audio output module 22 includes an audio output unit 221, a holding piece 222, and an ear hook 223. The audio output unit 221 includes a connecting portion 2211 and a circular speaker 2212. The connecting portion 2211 is connected between the pen body 21 and the circular speaker 2212. The audio output unit 221 protrudes from the pen body 21 along a direction that is substantially perpendicular to the axis of the pen body 21.

The shape of the holding piece 222 is similar to the shape of the accommodating opening 114, and is substantially arc-shaped. The holding piece 222 can totally cover the accommodating opening 114 when the multi-function touch pen 20 is received in the main body 10. A first end of the holding piece 222 is secured to the pen body 21 and substantially located at the same height as the speaker 2212. A second end of the holding piece 222 is located above the speaker 2212. A mounting post 2221 protrudes downward from an inside surface of the second end of the holding piece 222. A resisting end 2222 connects to the distal end of the mounting post 2221. The diameter of the resisting end 2222 is greater than the diameter of the mounting post 2221. A protrusion 2220 protrudes from the first end of the holding piece 222.

The shape of the ear hook 223 is similar to the shape of the holding piece 222, but little smaller than the holding piece 222. A mounting hole 2230 is defined in the ear hook 223, and located adjacent to a first end of the ear hook 223 corresponding to the mounting post 2221. The diameter of mounting hole 2230 is substantially equal to the diameter of the mounting post 2221. A hook portion 2231 is bent from a second end of the ear hook 223, for facilitating hanging the ear hook 223 to user's ear.

Figure 4:
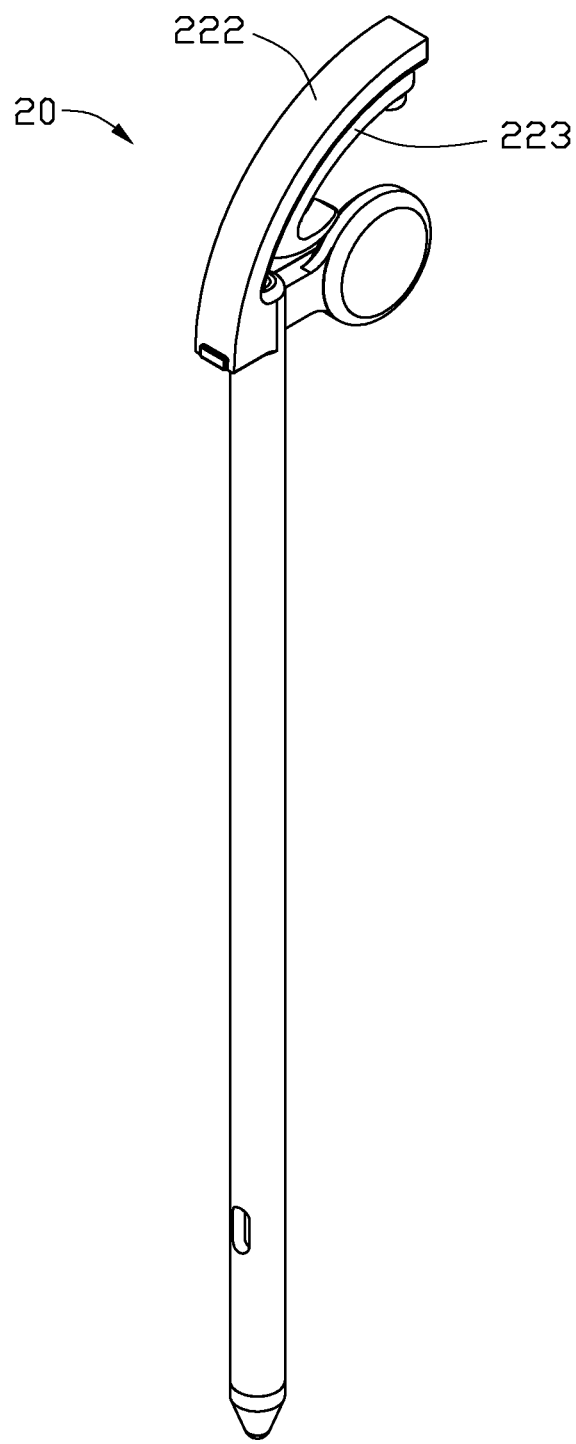
FIG. 4 is an assembled view of the multi-function touch pen of FIG. 3, showing a hook of the multi-function touch pen located in a first position.
Figure 5:
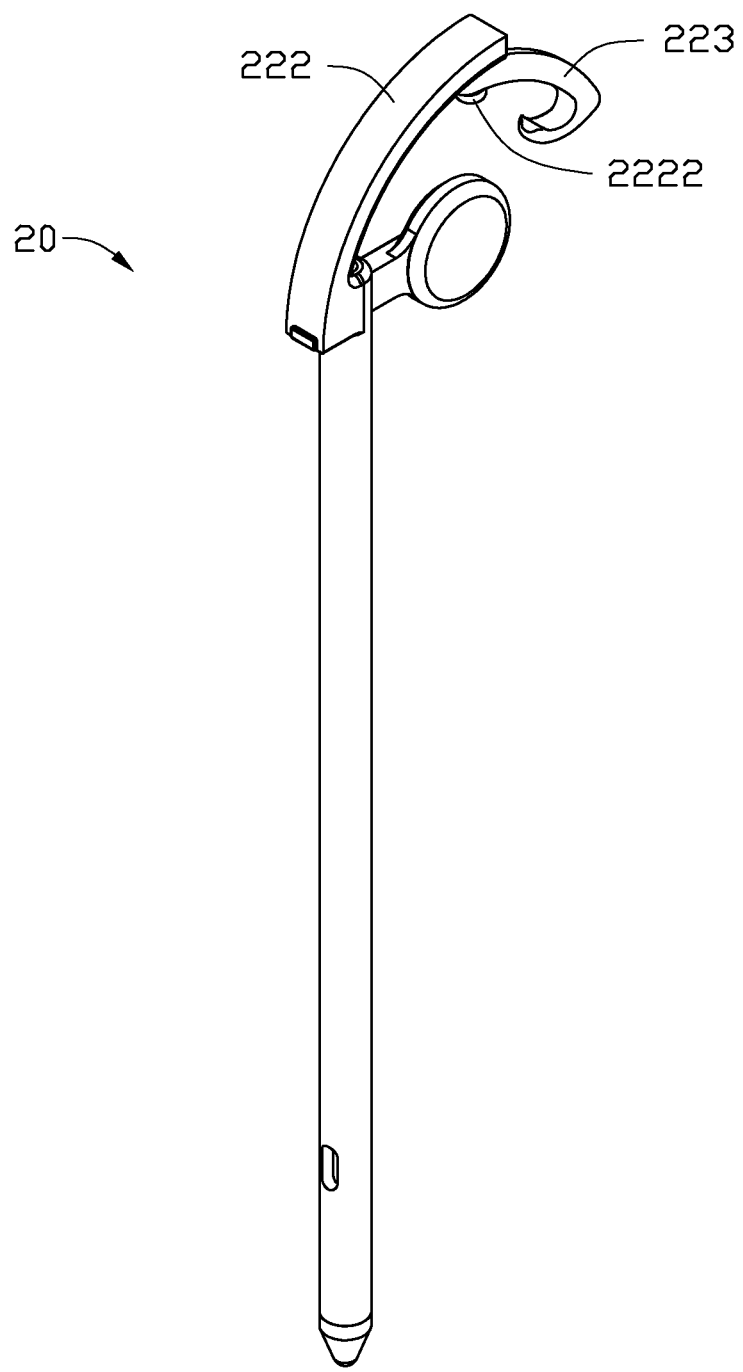
FIG. 5 is another assembled view of the multi-function touch pen of FIG. 3, showing the hook located in a second position.

Referring to the FIGS. 4 and 5, in assembly, the resisting end 2222 is aligned with the mounting hole 2230 and extruded to pass through the mounting hole 2230. The mounting post 2221 is inserted into the mounting hole 2230 to pivotally attach the ear hook 223 to the holding piece 222. The diameter of the resisting end 2222 is slightly greater than the diameter of the mounting hole 2230 to prevent the ear hook 223 from disengaging from the holding piece 222. The ear hook 223 can be rotated to a first position (see FIG. 4) or a second position (see FIG. 5) relative to the holding piece 222. In the first position, the ear hook 223 is received inside the holding piece 222. In the second position, the ear hook 223 is located away from the holding piece 222, for facilitating hanging the multi-function touch pen 20.

Figure 6:
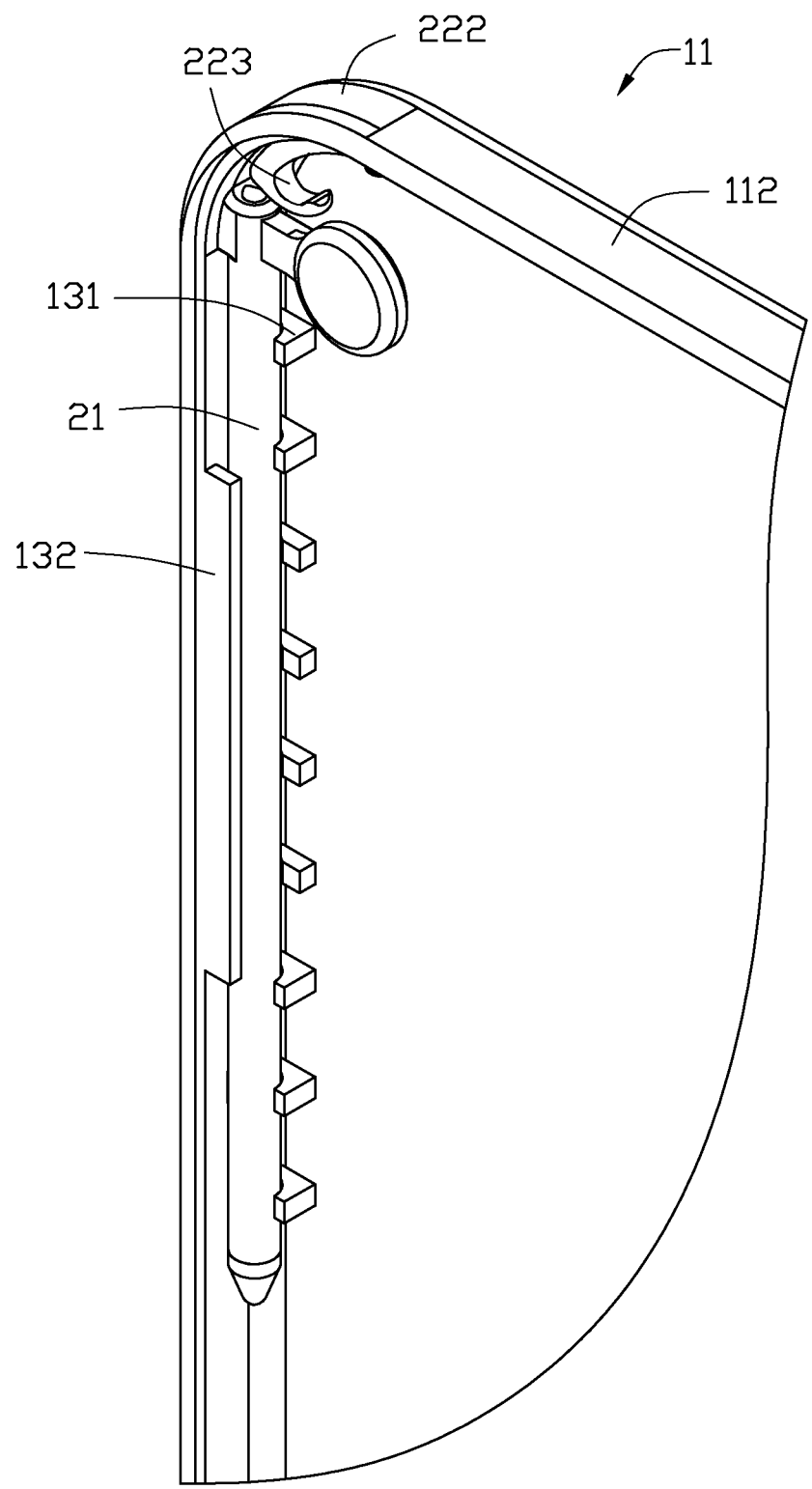
FIG. 6 is another partial, assembled view of the portable electronic device with the multi-function touch pen of FIG. 2.

Referring to the FIGS. 1 and 6, when the multi-function touch pen 20 is not used by users, the ear hook 223 is rotated to the first position. The multi-function touch pen 20 is inserted into the main body 10 through the accommodating opening 114 along a first direction, until the holding piece 222 totally covers the accommodating opening 114. The outside surface of the holding piece 222 smoothly connects to the outside surface of the main body 10. The pen body 21 is located in the plurality of cutouts 1310, and sandwiched between the clamping piece 132 and the plurality of supporting pieces 131. The audio input unit 23 is aligned with the through hole 117. Audio signals can be inputted into the audio input unit 23 when the multi-function touch pen 20 is received inside the main body 10. The protrusion 2220 is resisted to one of the rear panel 113 to prevent the multi-function touch pen 20 moving downwardly. Further, the protrusion 2220 is protruded from the outside surface of the main body 10 for facilitating moving the multi-function touch pen 20.

When the multi-function touch pen 20 needs to be used by users, the protrusion 2220 is moved upwards along a second direction opposite to the first direction. The multi-function touch pen 20 is disengaged from the main body 10 via the accommodating opening 114. The touching input terminal 24 can be used to input information to the portable electronic device. The multi-function touch pen 20 can be also used to receive and output audio signals for communicating with others while it is connected to the portable electronic device by a wireless connection, such as Bluetooth.

The embodiments shown and described above are only examples. Many details are often found in the art such as the other features of a touch screen mobile phone. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device, comprising:
   a main body comprising a touch sensitive display panel and a mounting module located inside the main body; and
   a multi-function touch pen, comprising a pen body with a touching input terminal, an audio input unit, and an audio output module, the audio output module located adjacent to a first end of the pen body, and the touching input terminal located at a second end of the pen body, and the audio input unit located adjacent to the second end of the pen body;
   wherein the main body has an accommodating opening, the multi-function touch pen is insertable into the main body via the accommodating opening and secured by the mounting module, or movable away from the main body via the accommodating opening;
   wherein a through hole is defined in the main body corresponding to the audio input unit; when the multi-function touch pen is received in the main body, the audio input unit is aligned with the through hole, and audio signals are inputted into the audio input unit via the through hole.

2. The portable electronic device of claim 1, wherein the audio output module comprises an audio output unit, the audio output unit protrudes from the first end of the pen body along a direction that is substantially perpendicular to an axis of the pen body.

3. The portable electronic device of claim 2, wherein the audio output module further comprises an ear hook and a holding piece, a first end of the holding piece is secured to the pen body; and the ear hook is pivotably attached to a second end of the holding piece.

4. The portable electronic device of claim 3, wherein a mounting post is protruded from an inside surface of the second end of the holding piece; a mounting hole is defined in the ear hook corresponding to the mounting post.

5. The portable electronic device of claim 4, wherein the ear hook is rotatable between a first position and a second position relative to the holding piece; in the first position, the ear hook is located below and shielded by the holding piece, and in the second position, the ear hook is located away from the holding piece.

6. The portable electronic device of claim 3, wherein the shape of the holding piece is similar to the shape of the accommodating opening; when the multi-function touch pen is received in the main body, the holding piece totally covers the accommodating opening.

7. The portable electronic device of claim 3, wherein a protrusion protrudes from the first end of the holding piece; when the multi-function touch pen is received in the main body, the protrusion protrudes out from an outside surface of the main body.

8. The portable electronic device of claim 3, wherein the holding piece is arc-shaped.

9. The portable electronic device of claim 1, wherein the mounting module comprises a plurality of supporting pieces and a clamping piece; a cutout is defined in each of the plurality of supporting pieces; when the multi-function touch pen is received in the main body, the multi-function touch pen is sandwiched between the clamping piece and the plurality of supporting pieces.

10. An multi-function touch pen for a portable electronic device, comprising:
   a pen body comprising a touching input terminal, located at a first end of the pen body for inputting information to the portable electronic device, and an audio input unit located adjacent to the touch input terminal for inputting audio signals to the portable electronic device; and
   an audio output module located at a second end of the pen body for outputting audio signals generated from the portable electronic device;
   wherein the audio output module further comprises an ear hook and a holding piece, the ear hook is rotatable between a first position and a second position relative to the holding piece; in the first position, the ear hook is located below and shielded by the holding piece.

11. The multi-function touch pen of claim 10, wherein the audio output module comprises an audio output unit, the audio output unit protrudes from the second end of the pen body along a direction that is substantially perpendicular to an axis of the pen body.

12. The multi-function touch pen of claim 11, wherein a first end of the holding piece is secured to the pen body; and the ear hook is pivotably attached to a second end of the holding piece.

13. The multi-function touch pen of claim 10, wherein a mounting post is protruded from an inside surface of the second end of the holding piece; a mounting hole is defined in the ear hook corresponding to the mounting post.

14. The multi-function touch pen of claim 13, wherein the ear hook is arc-shaped, the mounting hole is located at one end of the ear hook, and a hook portion extends from another end of the ear hook.

15. The multi-function touch pen of claim 10, wherein in the second position, the ear hook is located away from the holding piece.

16. The multi-function touch pen of claim 10, wherein a protrusion protrudes from the first end of the holding piece for facilitating moving the multi-function touch pen.

17. The multi-function touch pen of claim 10, wherein the holding piece is arc-shaped, and the audio output unit is located below the holding piece.

18. The multi-function touch pen of claim 17, wherein the audio output unit comprises a connecting portion and a speaker, and the connecting portion is connected between the second end of the pen body and the speaker.

* * * * *